J. F. HAWORTH.
FILM SUPPORT FOR CAMERAS.
APPLICATION FILED SEPT. 27, 1917.
1,283,408.
Patented Oct. 29, 1918.
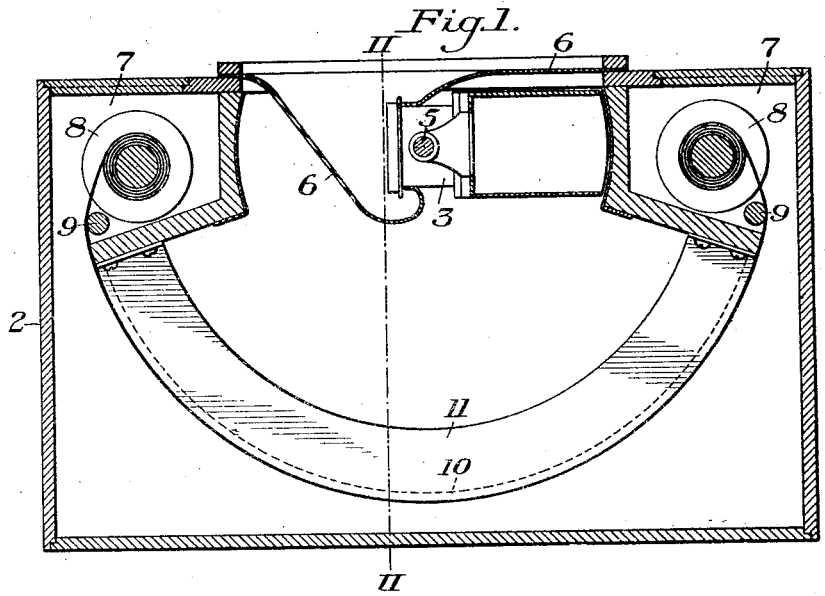
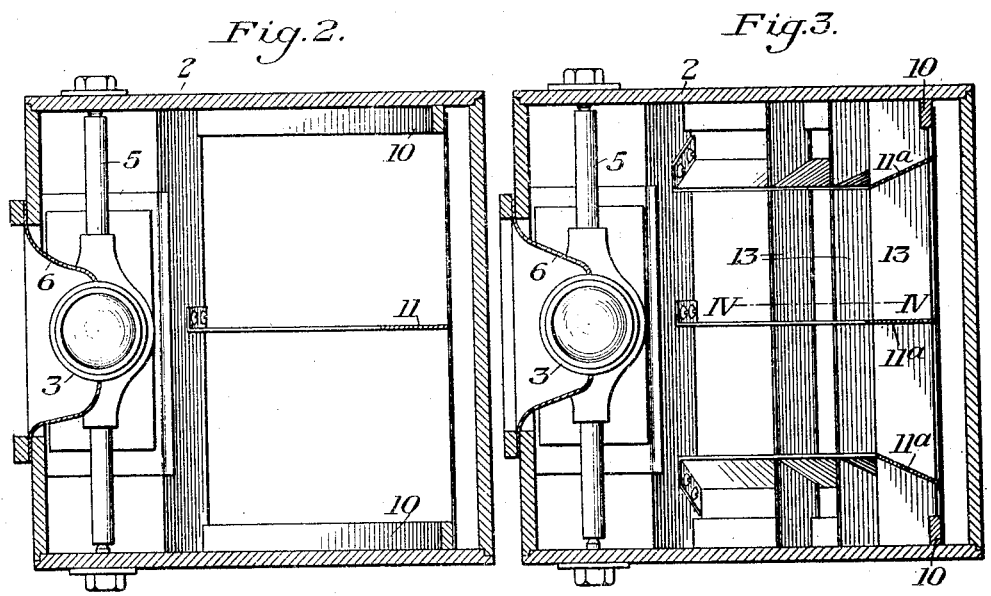
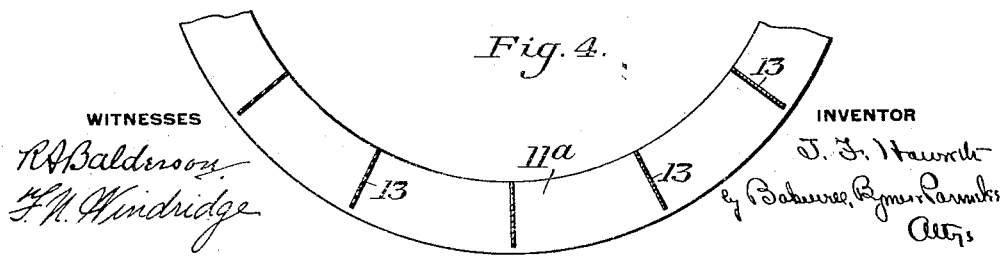
WITNESSES
R. A. Balderson
F. N. Windridge
INVENTOR
J. F. Haworth

UNITED STATES PATENT OFFICE.

JEHU FREDERIC HAWORTH, OF EDGEWORTH, PENNSYLVANIA.

FILM-SUPPORT FOR CAMERAS.

1,283,408.            Specification of Letters Patent.     Patented Oct. 29, 1918.

Application filed September 27, 1917. Serial No. 193,503.

*To all whom it may concern:*

Be it known that I, JEHU FREDERIC HAWORTH, a citizen of the United States, residing at Edgeworth, Allegheny county, Pennsylvania, have invented a new and useful Improvement in Film-Supports for Cameras, of which the following is a full, clear, and exact description, reference being had to the accompanying drawings, forming part of this specification, in which—

Figure 1 is a sectional view of one form of my improvement in connection with a panoramic camera.

Fig. 2 is a sectional view on the line II—II of Fig. 1.

Fig. 3 is a similar view showing a modified form of film supports, and

Fig. 4 is a detail sectional view of a portion of support shown in Fig. 3, on the line IV—IV.

This invention relates to film supports for cameras, and is designed to provide a cheap and efficient device which will prevent the film from vibrating and thereby the distortion of parts of the picture made thereon.

When taking photographs from moving objects such as aeroplanes, trains, etc., the film is liable to be vibrated by various causes, and particularly films in panoramic cameras which pass over curved guides.

I overcome this vibration by providing one or more guides of sheet metal or other material which is so placed that the edge thereof engages the front of the film between the usual film supports. These guides are so placed with relation to the lens that no shadows will be cast on the negative by the sides of the guides or supports, but only by the edge of the plate. This will merely make a line the width of the thickness of the metal from which the supports are formed. If two or more plates are used the plates will be placed at an angle to each other, the angle being determined by the angle of the lens and positions of the plates.

The precise nature of my invention will be best understood by reference to the accompanying drawings, which will now be described, it being premised, however, that various changes may be made in the details of construction and the general arrangement of the parts without departing from the spirit and scope of my invention as defined in the appended claims.

In the drawings the reference character 2 designates the box of the camera, 3 the lens frame arranged to swing therein on a post or shaft 5. This lens frame is provided with a lens in the front thereof and 6 is a flexible connection connected to the front of the box of the camera and front of the lens frame. Rotatably mounted in recesses 7, in the box of the camera, are film holding reels 8, the film passes from one of said reels to the other reel over the guide rollers 9 and the curved film guides 10 at the top and bottom of the box. The construction of the camera thus far described is old and well known to the art. That portion of the film between the rollers 9 and the guides 10 is liable to be vibrated by any slight jarring of the camera, or by the movement of air currents therein. Connected to any suitable portion of the box, such as the sides of the recesses 7, is a sector shaped plate 11, the sides of which are radially disposed with relation to the focal axis of the lens or the center of rotation of the lens, so that the only portion of the film not exposed is that immediately back of the edge of the plate 11, the thickness of which is determined by the thickness of the plate 11.

In some cases I may place a plurality of these circular plates, as indicated at 11$^a$, in Fig. 3, the angle of these plates being determined by the angle of the lens. I may also place a plurality of vertically disposed members 13 between the plates 11$^a$ which will form supports for the circular plates 11$^a$. The outer edges of these vertical plates may engage the film, or they may be slightly set back of the edges of the plates 11$^a$, so as not to come in contact with the film. These plates are also disposed at an angle to each other, so that neither of the plates will cast a shadow on the film other than that portion covered by the edges of these plates.

By providing one or more intermediate guides or supports for the film, the vibration thereof is largely overcome. This provision of intermediate supports for the films will also break up any air currents therein which may tend to vibrate the film, and will also divide up the exposed portion of the film into a plurality of different sections, while the side faces of the guides will tend to prevent halation and reflections within the camera. In the drawings I have shown my invention applied to a panoramic camera, but it will readily be understood by those familiar with the art that the invention is applicable to various other types of cameras.

The panoramic camera is used very extensively to-day for making photographs from aeroplanes, and in which successive photographs are made of the country over which the aeroplane is passing, in order to get a general lay of the topography thereof. The slight lines made on the negative by the plates in photographs of this character will be an advantage as they will divide the negative into a plurality of sections, so that distances from one point to another can readily be calculated.

I claim:

1. A camera having a lens and the usual film supports adjacent to the margins of the film, and an auxiliary support for the film between the said usual supports and in front of the film, substantially as described.

2. A camera having a lens and the usual film supports adjacent to the margins of the film, and a plurality of plate-like auxiliary supports for the film between the said usual supports and in front of the film, said supports extending approximately in radial lines from the focal axis of the lens, substantially as described.

3. A camera having a lens and the usual film supports adjacent to the margins of the film, and a plurality of radially disposed film supports between the said usual supports and in front of the film, substantially as described.

4. A camera having a swinging lens frame, a lens mounted therein, curved film supports for the edges of the film, guide rollers for the film, and a curved support of plate form between the curved film supports, substantially as described.

5. A camera having a swinging lens frame, a lens mounted therein, curved film supports for the edges of the film, guide rollers for the film, and a plurality of curved plate-like auxiliary supports between the first named curved supports, the plate-like supports lying at an angle to each other, substantially as described.

6. A camera having a swinging lens frame, a lens mounted therein, curved film supports for the edges of the film, guide rollers for the film, and a plurality of radially disposed members between the intermediate supports, substantially as described.

In testimony whereof, I have hereunto set my hand.

JEHU FREDERIC HAWORTH.

Copies of this patent may be obtained for five cents each, by addressing the "Commissioner of Patents, Washington, D. C."